D. HOLMES.
Artificial Veneers.
No. 5,960. Reissued July 7, 1874.
Fig. I
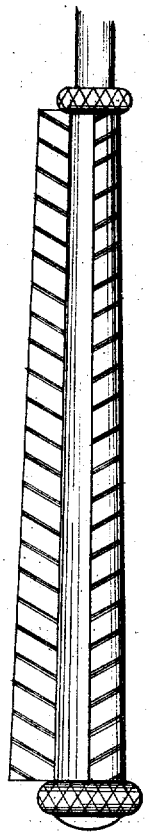
Fig. II
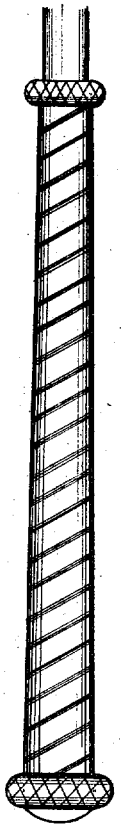
Witnesses.
Chas. P. Kemp.
E. Dudley Chapin.
Inventor.
David Holmes
by his Attorneys
Gardiner & Hyde
N. PETERS, PHOTO-LITHOGRAPHER, WASHINGTON, D. C.

UNITED STATES PATENT OFFICE.

DAVID HOLMES, OF WESTFIELD, MASSACHUSETTS, ASSIGNOR, BY MESNE ASSIGNMENTS, TO EPHRAIM G. HALL.

IMPROVEMENT IN ARTIFICIAL VENEERS.

Specification forming part of Letters Patent No. 125,134, dated April 2, 1872; reissue No. 5,960, dated July 7, 1874; application filed May 19, 1874.

*To all whom it may concern:*

Be it known that I, DAVID HOLMES, of Westfield, in the county of Hampden and State of Massachusetts, have invented a new and useful Improvement in Cloth Veneering, of which the following is a specification:

The object of this invention is to provide a cheap, durable, and highly ornamental veneering for all surfaces which it is desired to beautify or protect by a durable covering; and it consists in attaching firmly and permanently to the given surface an envelope of cloth or other textile fabric, upon which the selected design has previously been printed, and finishing up the new and ornamental surface thus formed by polishing and varnishing.

Heated glue is deemed the best material for effecting the union between the cloth and the surface to be ornamented. The glue should be applied to the surface until the pores are completely filled. Then the cloth or other fabric is to be laid on and immediately smoothed down, by the use of a sponge or other convenient appliance wet with hot glue, until the fabric is thoroughly saturated. By bringing a gentle pressure to bear upon the exterior of the cloth as it is being laid upon the surface, the air or excess of glue confined beneath it will be pressed out through the interstices of the fabric, and thus the cloth, by reason of its strength and pliability, can not only be laid on without wrinkles, but can be brought down into intimate contact with all parts of the surface, even though the surface be left to a considerable extent irregular and uneven.

This quality of cloth distinguishes its use for the purpose indicated from the use of paper or veneer of wood. By reason of the comparative lack of porosity of the last-named materials it is impossible to cause them to enter and adhere as closely to the depressed parts of the surface as cloth can be made to do. This superiority in the use of cloth makes it specially available for veneering forms that have been molded into irregular shapes, according to any desired pattern. Where, again, cloth or other textile fabric is used for a covering, the fibers become embedded in the glue, which presses up through all the interstices of the material, and thus it is held much more firmly than paper or wood could be, since both wood and paper would lie upon the top of the glue, instead of being embedded in it. For this reason, when paper or wood is used, the tendency of the glue, which shrinks in drying, is to draw away from the inner face of the veneering in all the depressions or concavities of the surface to be covered, while with cloth, or other similar fabric in which the glue permeates the whole of it, the fibers are necessarily drawn down with the glue as it dries and contracts. After the glue has become thoroughly dried, the surface is to be polished up and varnished by any of the modes adapted thereto, such as are ordinarily used to produce a polished surface upon wood.

Where cloth is used in which the figures strike through the fabric, it is plain that the figures will be preserved as the surface is reduced by wear until only a small proportion of the original cloth is left, and this quality of cloth gives it a marked superiority over ordinary papered or painted surfaces. As the wear takes place, the surface can be restored by polishing and varnishing, and this operation can be repeated until the entire fabric of the cloth is worn through. For this reason it is specially applicable as a covering for whip-handles, the interior of carriages and railroad-cars, and other surfaces which are subjected to great wear, but which it may be desired to protect by a durable and an ornamental covering.

This style of covering, again, is specially adapted to wood surfaces, particularly when the wood has been wrought into thin forms, or is used in situations where, from changes of temperature or otherwise, it is subjected to strain, and becomes liable to warp and crack. Under all such circumstances the pressure of the cloth, which has been drawn down into such intimate contact with the wood, adds very materially to its strength, largely preventing the formation of cracks and checks; and even when these do form to some extent the pressure of the cloth, which has not wholly lost its stretch, will tend to prevent them from coming through to the surface.

The drawing shows the invention as applied to the handle of a whip, Figure 1 showing the cloth as only partially wrapped around the handle, while Fig. 2 represents the work as completed.

It is evident, however, that the invention is not limited to this one application, but, as above indicated, may be used with advantage whenever it is desired to beautify or to protect surfaces by a durable covering.

The great economy attending this mode of decoration, as compared with the use of ornamental veneers of wood or the painting of landscapes and other pictures upon the surface to be adorned, will be apparent when it is considered at how trifling a cost, comparatively, elaborate and highly ornamental designs can be printed upon cloth, and that these designs, by the process hereinbefore described, can then be transferred to and permanently secured upon the surface, which can then be finished up by polishing and varnishing without injury to the colors constituting the picture or design.

Veneering wood and other surfaces, as above described, by means of ornamented cloth or other textile fabric attached directly to the surface by the use of glue or any equivalent adhesive substance, is a radically different invention from the use of cloth in combination with a plastic composition in the manufacture of compound veneers, into which the cloth enters as an element only, but does not itself constitute the veneer, as described in the English patent of Frederick Walton, No. 12, dated January 4, 1858.

What I claim as new is—

1. In combination with the surface to be covered, a veneering of cloth or other textile fabric, ornamented by painting, printing, or otherwise, and applied, cemented, and finished up substantially as described.

2. In combination with a wood surface, a veneering of cloth or other textile fabric, ornamented by painting, printing, or otherwise, and applied, cemented, and finished up substantially as described.

DAVID HOLMES.

Witnesses:

BENJ. A. SMITH,

E. G. HALL.